2091X
J. H. Derby,
Making Combs.
Patented Mar. 26, 1814.
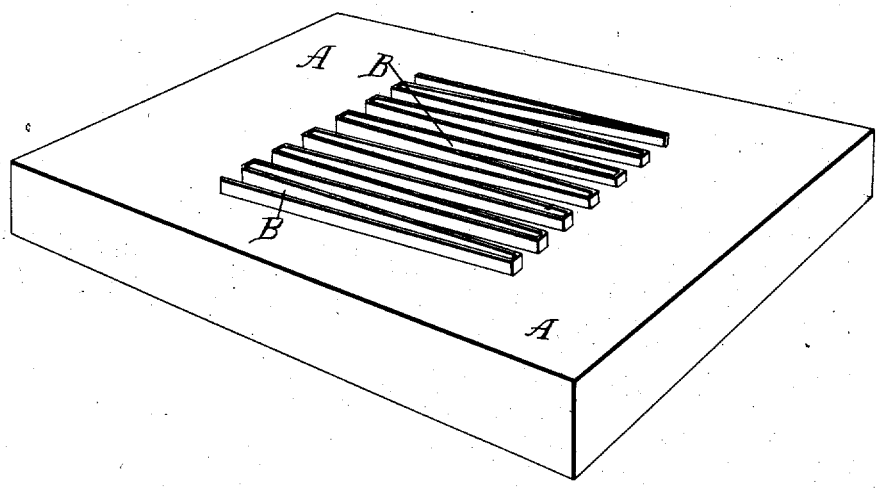

March 20. 1814

Joseph Heartwell Derby

2091X

Letters Patent

The schedule referred to in these Letters Patent and making
part of the same containing a description in the words of the
said Joseph Heartwell Derby, himself of his machine for
cutting combs at a single operation The plate or block is usually made of brass or
copper into which are inserted thin plates or knives of hardened
steel in such manner as to cut the teeth of two combs out of
a single plate or piece of horn or shell at one and the same ope
-ration the operation is performed by placing a piece of horn or
shell suitably prepared in the machine and the teeth are then cut
by a blow being given thereon with a heavy mallet, or the ope
ration may be performed by a press The piece of horn or shell must
be of such dimensions as to form the teeth and the tops or
backs of two entire combs, and the teeth of one comb, are cut out
between the teeth of the other, the tops or backs being left entire
and opposite to each other similar to ones placing his fingers
between each other, his hands being open and the palm of his
hands being considered the tops or backs of the combs, his fingers
the teeth, By this method of cutting teeth a saving is made
of at least one half of the quantity of stock which would be
necessary in the usual method of cutting the teeth with a saw
and a great saving is also made in the time spent in cutting Witness Will. Perry
John [illegible]

Joseph Heartwell Derby

Drawing Made

[illegible]